United States Patent
Geno

(10) Patent No.: US 9,893,503 B2
(45) Date of Patent: Feb. 13, 2018

(54) ELECTRICAL BOX WITH ADJUSTABLE SLEEVE

(71) Applicant: Allied Moulded Products, Inc., Bryan, OH (US)

(72) Inventor: Evan J. Geno, Malinta, OH (US)

(73) Assignee: ALLIED MOULDED PRODUCTS, INC., Bryan, OH (US)

( * ) Notice: Subject to any disclaimer, the term of this patent is extended or adjusted under 35 U.S.C. 154(b) by 0 days.

(21) Appl. No.: 14/945,634

(22) Filed: Nov. 19, 2015

(65) Prior Publication Data

US 2016/0172832 A1 Jun. 16, 2016

Related U.S. Application Data

(60) Provisional application No. 62/090,392, filed on Dec. 11, 2014.

(51) Int. Cl.
*H02G 3/08* (2006.01)
(52) U.S. Cl.
CPC .................. *H02G 3/086* (2013.01)

(58) Field of Classification Search
USPC .......................................................... 174/502
See application file for complete search history.

(56) References Cited

U.S. PATENT DOCUMENTS

| | | | |
|---|---|---|---|
| 6,629,619 B2 * | 10/2003 | Sato ...................... | H02G 3/088 220/3.8 |
| 6,908,003 B2 | 6/2005 | Feyes et al. | |
| 7,855,338 B2 * | 12/2010 | Troder ................... | H02G 3/081 174/135 |
| 8,124,872 B2 * | 2/2012 | Vigorito ........... | B29C 45/14311 174/50 |
| 8,704,107 B2 | 4/2014 | Laukhuf | |
| 2012/0186871 A1 * | 7/2012 | Roberts .................. | H02G 3/086 174/520 |

* cited by examiner

*Primary Examiner* — Dhirubhai R Patel
(74) *Attorney, Agent, or Firm* — James D. Miller; Schumaker, Loop & Kendrick, LLP

(57) ABSTRACT

An electrical box assembly includes an outer box having a sidewall and a front opening. A sleeve having an inner surface is received in the front opening of the outer box and selectively extendable in respect of the outer box. A mounting plate is disposed on the inner surface of the sleeve. The mounting plate cooperates with the sleeve to selectively position the sleeve in respect of the outer box.

15 Claims, 3 Drawing Sheets

ELECTRICAL BOX WITH ADJUSTABLE SLEEVE

CROSS-REFERENCE TO RELATED APPLICATIONS

This patent application claims the benefit of U.S. Patent Provisional Application Ser. No. 62/090,392, filed on Dec. 11, 2014. The entire disclosure of the above patent application is hereby incorporated herein by reference.

FIELD

The present invention relates to an electrical box and more particularly to an electrical box having an adjustable sleeve that facilitates an extension of the electrical box while maintaining a vapor barrier in building construction.

BACKGROUND OF THE INVENTION

Typically, an electrical box is used to support and contain electrical devices and wiring in a centralized space. The electrical box protects the wiring and the electrical devices contained therein from extrinsic conditions. The electrical box is typically connected to a joist, a stud, or another structural component or surface of a building. A wall and/or ceiling substrate or membrane (such as drywall, for example) is secured to the structural components of the building and contains an opening for receiving the electrical box. An open face of the electrical box is usually positioned flush with a surface of the wall or the ceiling substrate and configured to receive an electrical device.

Prior art electrical boxes include mounting systems with fastening devices that facilitate a connection to mounting structures or directly to the structural components of the building. However, sometimes a thickness of the wall or the ceiling substrate may vary or may be unknown when installing the electrical box during construction. This unknown variable may cause the open face of the electrical box to undesirably recede or protrude from the substrate. In most scenarios, if an adjustment of the electrical box is desired, the entire electrical box must be repositioned. A repositioning of the electrical box may require completely removing the fastening devices from the mounting structures or the structural components which can be inefficient. Adjustment may also require significant retrofitting of the electrical box or an addition of extra components to the electrical box.

Currently, there is also a continuing need for buildings constructed to conserve energy. Electrical boxes that facilitate energy conservation and militate against air and vapor filtration are desired for such buildings. Such electrical boxes may include a flange that cooperates with the wall or ceiling substrate to create a vapor seal. However, in order to correct the receding or protruding electrical box, adjustment of the entire electrical box may interfere with proper sealing due to the flange improperly aligning with the substrate.

It would be desirable to produce an electrical box with an adjustable sleeve that facilitates an adjustment of the electrical box while maintaining a vapor seal, wherein an ease of adjusting the electrical box is maximized and a complexity of assembly of the electrical box is minimized.

SUMMARY OF THE INVENTION

In accordance and attuned with the present invention, an electrical box with an adjustable sleeve that facilitates an adjustment of the electrical box while maintaining a vapor seal, wherein an ease of adjusting the electrical box is maximized and a complexity of assembly of the electrical box is minimized, has surprisingly been discovered.

According to an embodiment of the present disclosure, an electrical box assembly includes an outer box having a sidewall and a front opening. A sleeve having an inner surface is received in the front opening of the outer box. The sleeve is selectively extendable in respect of the outer box. A mounting plate is disposed on the inner surface of the sleeve. The mounting plate cooperating with the sleeve to selectively position the sleeve in respect of the outer box.

According to another embodiment of the present disclosure, an electrical box assembly is disclosed. The electrical box assembly includes an outer box having a plurality of sidewalls, a front opening, and a flange extending laterally outwardly from the plurality of sidewalls. A mounting plate is disposed within the outer box. A sleeve is received in the front opening of the outer box and slideably disposed intermediate the outer box and the mounting plate. The mounting plate cooperates with the sleeve to selectively position the sleeve in respect of the outer box.

According to yet another embodiment of the present disclosure, an electrical box assembly is disclosed. The electrical box assembly includes an outer box having a sidewall and a front opening. The sidewall includes a fastener aperture formed therein. A sleeve is slideably received in the front opening of the outer box and extendable in respect of the outer box. The sleeve has an inner surface and a slot formed therein. The slot aligns with the aperture of the outer box. A mounting plate is disposed on the inner surface of the sleeve. The mounting plate includes a fastener aperture formed therein to receive the mounting fastener. The fastener aperture of the mounting plate aligns with the slot of the sleeve and the fastener aperture of the outer box. A fastener extends through the fastener aperture of the mounting plate, the slot of the sleeve and the fastener aperture of the outer box to couple the electrical box assembly to a support member.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The above advantages of the invention will become readily apparent to those skilled in the art from reading the following detailed description of an embodiment of the invention in the light of the accompanying drawings, in which.

DETAILED DESCRIPTION OF THE PREFERRED EMBODIMENT

Figure 1:
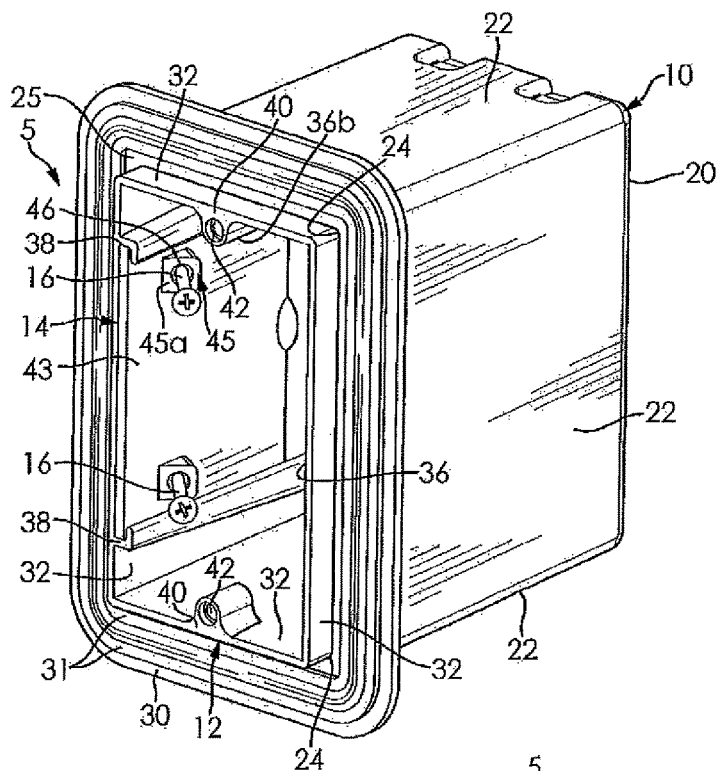
FIG. 1 is a top perspective view of an electrical box assembly according to an embodiment of the disclosure.

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. For purposes of this disclosure and the claims herein, the terms "right," "left," "front," and "back" (or "forward" and "rearward") respectively indicate directions which are relative to the arrangement of the electrical box assembly with respect to a building substrate.

FIGS. 1-4 illustrate an electrical box assembly 5. The electrical box assembly 5 includes an outer box 10, a sleeve 12 slideably received within the outer box 10 and extendable in respect of the outer box 10, and a mounting plate 14 slidingly coupled to the sleeve 12. Mounting fasteners 16 are received through the electrical box assembly 5 and configured to couple the electrical box assembly 5 to a support member 100.

The electrical box assembly 5 is configured to be mounted to the support member 100 and couple an electrical device (not shown) thereto. The electrical box assembly 5 is configured to be adjusted with respect to the support member 100 and a building substrate (not shown). In the embodiments illustrated, the electrical box assembly 5 is configured as a single gang electrical box assembly and has a substantially rectangular shape. However, the electrical box assembly 5 can be configured as a two, three, four, or more gang electrical box assembly. Additionally, the electrical box assembly can be configured as a circular or polygonal electrical box assembly if desired.

Figure 5:
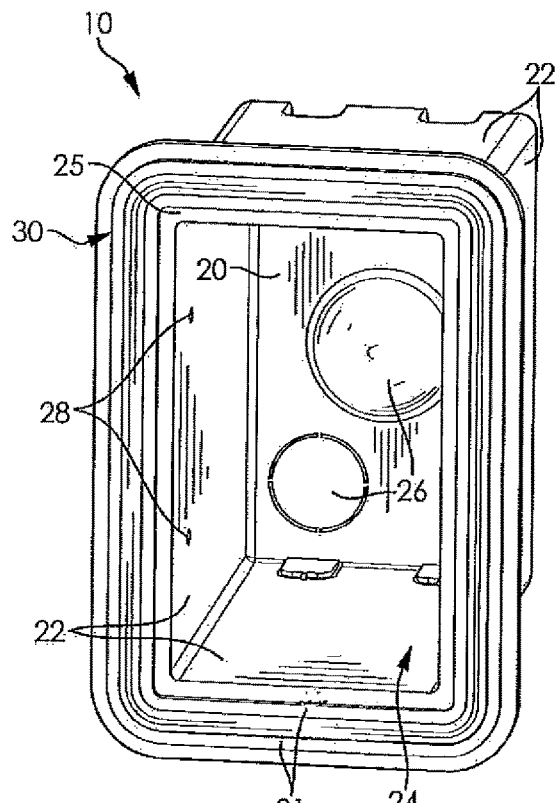
FIG. 5 is a front perspective view of an outer box of the electrical box assembly of FIGS. 1-4.

As shown in FIG. 5, the outer box 10 includes a back wall 20 and a plurality of sidewalls 22 extending from the back wall 20. The back wall 20 and the sidewalls 22 cooperate to define a hollow interior space of the outer box 10 with a front opening 24 permitting access to the interior space. As shown, knockouts 26 are formed in the back wall 20 and are selectively removable to form openings defining passages for conduits or wires. However, the knockouts 26 can also be formed in the sidewalls 22, if desired. Fastener apertures 28 are formed in a first one of the sidewalls 22 for receiving the mounting fasteners 16. In the embodiment illustrated, the fastener apertures 28 are formed in the left sidewall 22. However, it is understood, the fastener apertures 28 can be formed in any of the sidewalls 22 depending on the application.

The outer box 10 further includes a vapor seal flange 30 extending laterally outwardly from the sidewalls 22 of the outer box 10. A front surface if the flange 30 is configured to seal against the substrate. As shown, the flange 30 is disposed adjacent and circumscribing a front edge 25 defining the front opening 24. However, the flange 30 can be disposed at a distance from the front edge 25 of the outer box 10 defining the front opening 24, if desired. In certain embodiments, protuberances 31 are formed on the flange 30 along the front surface thereof to facilitate sealing to the substrate. As illustrated, the protuberances 31 are elongate and circumscribe the front opening 24.

In the illustrated embodiment, the outer box 10 has four sidewalls 22, wherein the sidewalls 22 and the back wall 20 cooperate to form a substantially rectangular shaped outer box. It should be understood that the back wall 20 and the side walls 22 can have other configurations, as desired, to provide alternate shapes to the outer box 10 depending on the desired shape and purpose of the electrical box assembly 5.

Figure 6:
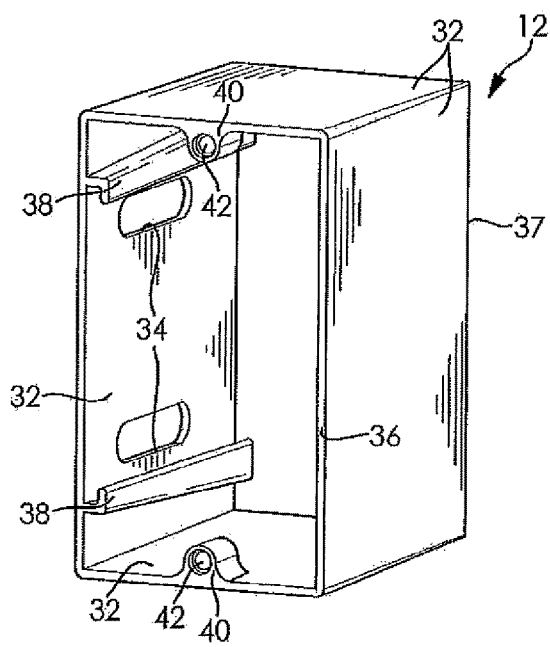
FIG. 6 is a front perspective view of the sleeve of the electrical box assembly of FIGS. 1-4.

As shown in FIG. 6, the sleeve 12 is substantially hollow and includes a plurality of walls 32 defining an interior space. Substantially parallel, spaced apart, elongate slots 34 are formed in a first one of the walls 32. The slots 34 extend in a direction from a front edge 36 of the sleeve 12 toward a back edge 37 of the sleeve 12. It is understood, the slots 34 can be formed in any one of the walls 32, as desired. The slots 34 are configured to align with and are spaced apart from each other at a distance substantially equal to a distance between the fastener apertures 28 of the outer box 10 and are configured to receive the mounting fasteners 16 therein.

A pair of spaced apart, elongate rails 38 is formed on an inner surface of the first one of the walls 32 of the sleeve 12 having the slots 34. The slots 34 are disposed between the rails 38 and substantially parallel with the rails 38. It is understood that additional or fewer rails 38 may be formed on the inner surface of the sleeve 12, as desired. The rails 38 extend in a direction from the front edge 36 of the sleeve 12 toward the back edge 37 of the sleeve 12 defining a channel therebetween. As shown, the rails 38 are substantially L-shaped in cross-section, although it is understood that the rails 38 can have any cross-sectional shape as desired.

The sleeve 12 also includes bosses 40 extending inwardly into the inner space of the sleeve 12 at the front edge 36 of the sleeve 12. Each of the bosses 40 includes at least one aperture 42 formed therein. The bosses 40 are configured to receive a fastener to attach the electrical device to the sleeve 12.

In the illustrated embodiment, the walls 32 of the sleeve 12 form a generally rectangular shaped tube to correspond to the shape of the outer box 10. It should be understood that the walls 32 can have other configurations, as desired, to provide alternate overall shapes of the sleeve 12 depending on the desired shape and purpose of the electrical box assembly 5.

Figure 2:
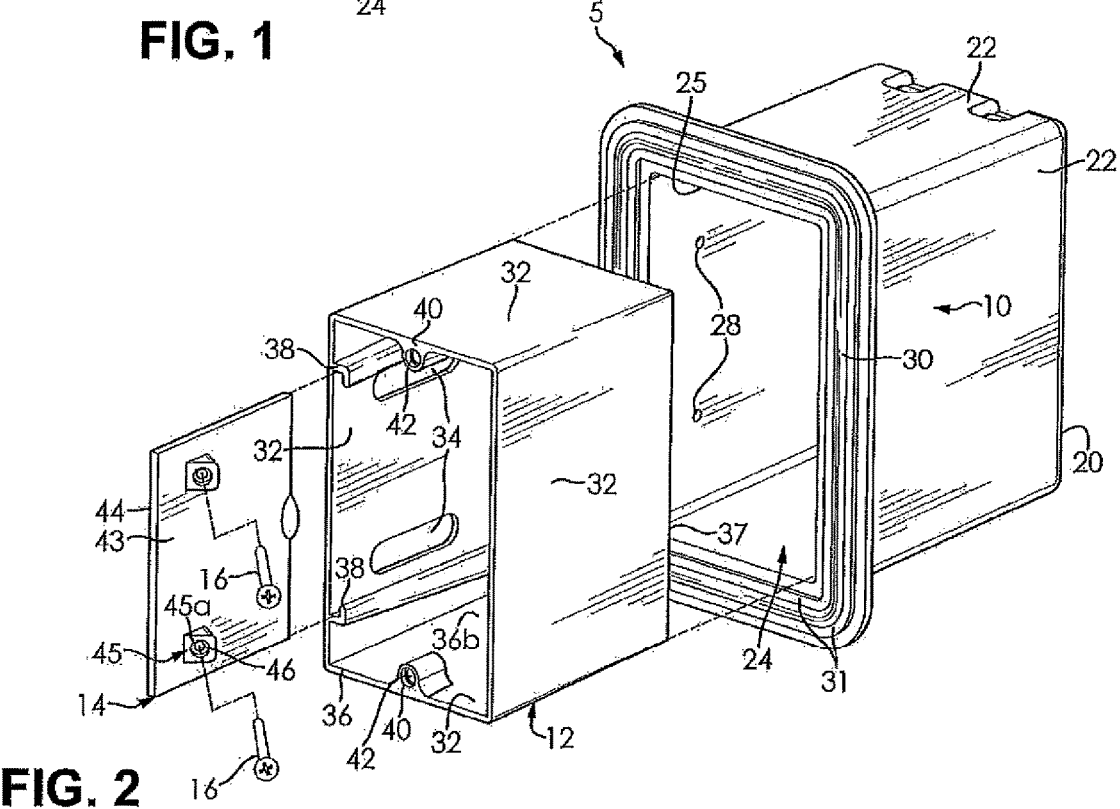
FIG. 2 is an exploded top perspective view of the electrical box assembly of FIG. 1.

As shown in FIG. 2, the mounting plate 14 includes a first surface 43, a second surface 44, and bosses 45 extending laterally outwardly from the first surface 43 thereof. The mounting plate 14 is configured to be received in the channel defined by the rails 38 and has a length substantially equal to the distance between the rails 38 of the sleeve 12. An edge of the mounting plate 14 is received in the L-shaped portion of each of the rails 38 of the first one of the sidewalls 32 of the sleeve 12 to facilitate a sliding of the mounting plate 14 between the rails 38. The bosses 45 include fastener apertures 46 formed therein and extending through the mounting plate 14 for receiving the mounting fasteners 16 therethrough. The bosses 45 are separated from each other at a distance substantially equal to a distance between the slots 34 of the sleeve 12 and a distance between the fastener apertures 28 of the outer box 10. The bosses 45 have a generally triangular cross-sectional shape, wherein a slope surface 45a of the bosses 45 tapers towards the front of the electrical box assembly 5 when assembled. It should be understood that the bosses 45 may have any other cross-sectional shapes as desired, such as ovular, circular, rectangular, and the like. The fastener apertures 46 of the bosses 45 of the mounting plate 14 extend through the mounting plate 14 at an angle with respect to the first surface 43 of the mounting plate 14.

To assemble, the sleeve 12 is slideably received in the interior space of the outer box 10, wherein the back edge 37 of the sleeve 12 is disposed adjacent the back wall 20 of the outer box 10. The slots 34 of the sleeve 12 align with the fastener apertures 28 of the outer box 10. The mounting plate 14 cooperates with the mounting fasteners 16 to mount the sleeve 12 to the outer box 10 and the electrical box assembly 5 to the support member 100. The mounting plate 14 is slideably received adjacent the inner surface of the sleeve 12 in the channel formed by the rails 38, wherein the bosses 45 of the mounting plate 14 extend inwardly towards the interior space of the sleeve 12. The fastener apertures 46 of the mounting plate 14 align with the slots 34 formed in the sleeve 12 and the fastener apertures 28 of the outer box 10.

The mounting fasteners 16 are received through the fastener apertures 46 of the mounting plate 14, the slots 34 of the sleeve 12, and the fastener apertures 28 of the outer box 10 to couple the outer box 10 to the support member 100. A head of the mounting fasteners 16 extends outwardly from the bosses 45 of the mounting plate 14 into the interior space formed by the sleeve 12 and generally toward the front opening 24 of the outer box 10.

Figure 3:
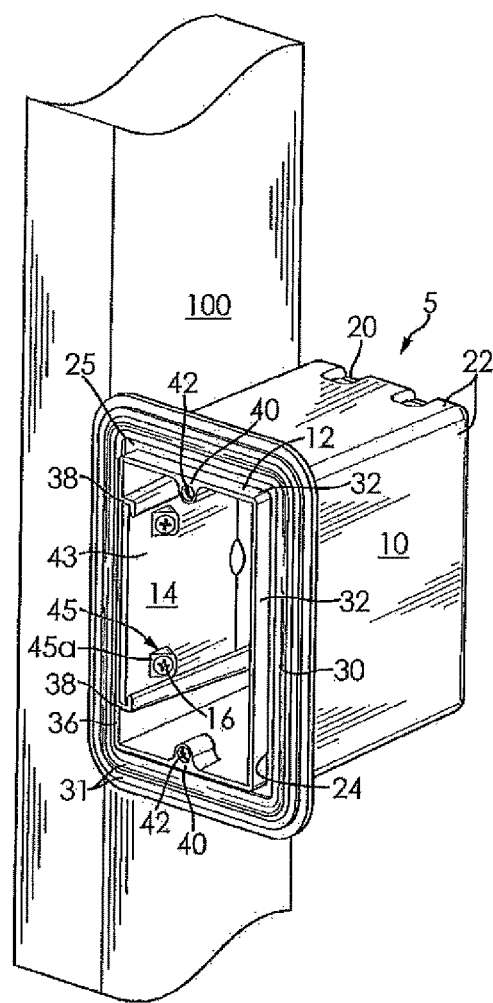
FIG. 3 is a top perspective view of the electrical box assembly of FIG. 1, wherein the electrical box assembly is attached to an exemplary fragmentary support member, and wherein the sleeve of the electrical box assembly is in a retracted position.
Figure 4:
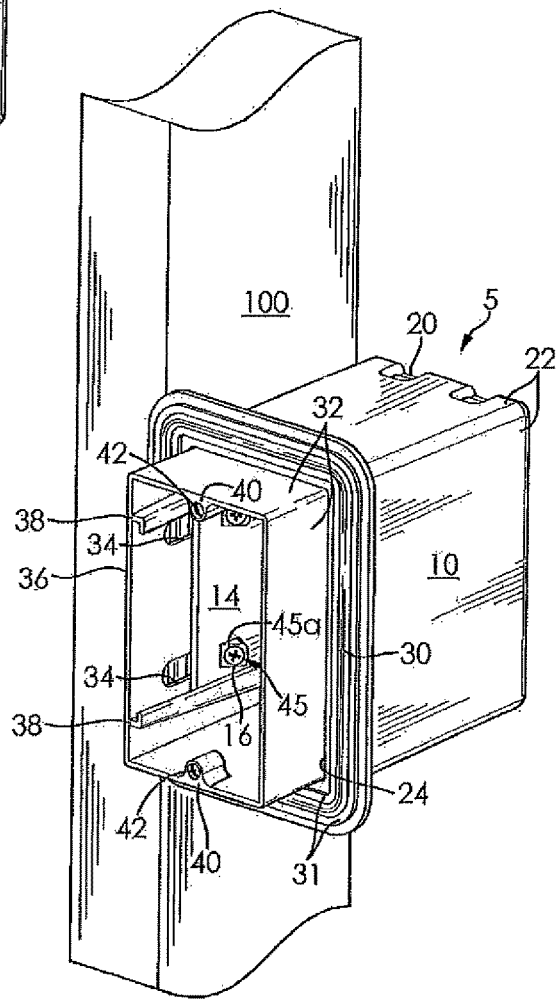
FIG. 4 is a top perspective view of the electrical box assembly of FIG. 1, wherein the electrical box assembly is attached to an exemplary fragmentary support member, and wherein the sleeve of the electrical box assembly is in an extended position.

The sleeve 12 is permitted to slideably move with respect to the outer box 10 from a retracted position (as shown in FIG. 3) to an extended position (as shown in FIG. 4) and intermediate positions. In the retracted position, the mounting fasteners 16 are positioned at an end of the slots 34 of the sleeve 12 adjacent the front edge 36 of the sleeve 12. In the extended position, the mounting fasteners 16 are positioned at an opposing end of the slots 34 of the sleeve 12 adjacent the back edge 37 of the sleeve 12. In the embodiments shown, in the extended position, the sleeve 12 extends from the front edge 25 of the outer box 10 at a distance equal to about 1.25 inches. In the retracted position, the sleeve 12 extends from the front edge 25 of the outer box 10 at a distance equal to about 0.50 inches. However, it is understood that the sleeve 12 can extend any distance from the front edge 25 of the outer box 10, as desired.

In use, the electrical box assembly 5 is positioned in a desired position with respect to the support member 100. The support member 100 can be any structural component such as a joist, a stud, or any other structural component or surface of a building, as desired. In certain embodiments, the electrical box assembly 5 may be positioned with respect to the support member 100 so the front surface of the flange 30 can align and abut with an inner surface of the substrate, when installed, to facilitate a vapor seal. A user typically inserts the mounting fasteners 16 through the fastener apertures 46 formed in the mounting plate 14, the slots 34 formed in the sleeve 12, and the fastener apertures 28 formed in the outer box 10. The mounting fasteners 16 then extend into the support member 100 for mounting thereto.

The mounting fasteners 16 are configured to urge the mounting plate 14, the sleeve 12, and the outer box 10 towards the support member 100 causing the mounting plate 14, the sleeve 12, and the outer box 10 to begin to compress together. When the mounting fasteners 16 are substantially fully secured to the support member 100, the mounting plate 14 and support member 100 create a clamping force therebetween. The clamping force militates against relative movement between the support member 100, the outer box 10, the sleeve 12, and the mounting plate 14. In certain embodiments, the mounting fasteners 16 are threaded. Accordingly, rotation of the mounting fasteners 16 in respect of the fastener apertures 46 urges the mounting plate 14 towards the support member 100. The slope surface 45a and the angled fastener apertures 46 allow the user to easily access the mounting fasteners 16 within the electrical box assembly with a tool, such as a screw drive, for example.

Typically, the substrate is secured to the structural components of a building and an opening is formed in the substrate for the electrical box assembly 5 to be received therethrough. Prior to fully securing the mounting fasteners 16 to the support member 100 to create the clamping force, the sleeve 12 may be selectively adjusted to the extended position, the retracted position, or intermediate position. The amount of adjustment of the sleeve 12 is dependent upon a thickness of the substrate. During adjustment of the sleeve 12, the mounting fasteners 16 slide within the slots 34 of the sleeve 12. Once the sleeve 12 is in a desired position, the mounting fasteners 16 are tightened to the support member 100 to employ the clamping force.

In the event it is desired to adjust the position of the sleeve 12 after fully securing the mounting fasteners 16 to the support member 100, the mounting fasteners 16 can be loosened to reduce or substantially eliminate the clamping force between the mounting plate 14 and the support member 100. The sleeve 12 can be adjusted and the mounting fasteners 16 can be re-tightened to re-secure the electrical box assembly 5 to the support member 100.

The attachment of the electrical device to the electrical box assembly 5 is achieved by inserting a fastener such as a nail or a screw, for example, through the apertures 42 formed in the bosses 40 of the sleeve 12.

Advantageously, the electrical box assembly 5 can be easily adjusted in respect of the substrate without a complete removal or retrofitting thereof. Additionally, the flange 30 effectively cooperates with the inner surface of the substrate to maintain a vapor seal to facilitate energy conservation. Accordingly, substrates and vapor barriers having a variety of thicknesses can be accommodated by the electrical box assembly 5.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box assembly configured to couple to a support member, the electrical box assembly comprising:
   an outer box having a sidewall and a front opening, the sidewall including a fastener aperture formed therein;
   a sleeve having an inner surface and a slot formed therein, the sleeve received in the front opening of the outer box and selectively extendable in respect of the outer box;
   a mounting plate disposed on the inner surface of the sleeve and selectively extendable in respect of the sleeve, the mounting plate including a fastener aperture formed therein; and a mounting fastener including a shaft and a head, the shaft extending through the fastener aperture of the mounting plate, the slot of the sleeve, and the fastener aperture of the sidewall of the outer box, wherein the shaft of the mounting fastener extends into the support member, and wherein the mounting plate, the sleeve, and the sidewall of the outer box are compressed between the head of the mounting fastener and the support member to couple the electrical box assembly to the support member.

2. The electrical box assembly of claim 1, wherein the outer box has a flange extending laterally outwardly therefrom.

3. The electrical box assembly of claim 2, wherein a protuberance is formed on a surface of the flange to circumscribe the front opening of the outer box.

4. The electrical box assembly of claim 1, wherein the sleeve includes a pair of bosses extending inwardly from the inner surface thereof.

5. The electrical box assembly of claim 1, wherein the sleeve includes a pair of spaced apart elongate rails formed on the inner surface thereof, the mounting plate received intermediate the pair of spaced apart elongate rails.

6. The electrical box assembly of claim 1, wherein the fastener aperture of the mounting plate includes a boss and an aperture formed through the boss and the mounting plate, the aperture configured to receive the mounting fastener.

7. The electrical box assembly of claim 6, wherein the boss has a sloped surface.

8. The electrical box assembly of claim 1, wherein the outer box includes a knockout formed therein.

9. The electrical box assembly of claim 1, wherein the outer box and the sleeve are substantially rectangular shaped.

10. An electrical box assembly configured to couple to a support member, the electrical box assembly comprising: an outer box having a plurality of sidewalls, a front opening, and a flange extending laterally outwardly from the plurality of sidewalls, wherein one of the plurality of sidewalls includes a fastener aperture formed therein; a mounting plate disposed within the outer box, the mounting plate including a fastener aperture formed therein; a sleeve received in the front opening of the outer box, the sleeve slideably disposed intermediate the outer box and the mounting plate, the sleeve including a slot formed therein; and a mounting fastener including a shaft and a head, the shaft extending through the fastening aperture of the mounting plate, the slot of the sleeve, and the fastening aperture of the one of the sidewalls of the outer box, wherein the shaft of the mounting fastener extends into the support member, and wherein the mounting plate, the sleeve, and the one of the plurality of sidewalls of the outer box are compressed between the head of the mounting fastener and the support member to couple the electrical box assembly to the support member.

11. The electrical box assembly of claim 10, wherein a plurality of protuberances are formed on a surface of the flange to circumscribe the front opening of the outer box.

12. The electrical box assembly of claim 10, wherein the fastener aperture formed in the one of the plurality of sidewalls of the outer box aligns with the slot formed in the sleeve when the electrical box assembly is coupled to the support member.

13. The electrical box assembly of claim 12, wherein the fastener aperture formed in the mounting plate aligns with the fastener aperture formed in the one of the plurality of sidewalls of the outer box when the electrical box assembly is coupled to the support member.

14. The electrical box assembly of claim 10, wherein the sleeve includes a pair of spaced apart rails formed on an inner surface of the sleeve, the mounting plate received intermediate the pair of spaced apart rails.

15. An electrical box assembly configured to couple to a support member, the electrical box assembly comprising: an outer box having a sidewall and a front opening, the sidewall including a fastener aperture formed therein; a sleeve slideably received in the front opening of the outer box and extendable in respect of the outer box, the sleeve having an inner surface and a slot formed therein, the slot aligning with the aperture of the outer box; a mounting plate disposed on the inner surface of the sleeve, the mounting plate including a fastener aperture formed therein, the fastener aperture of the mounting plate aligning with the slot of the sleeve and the fastener aperture of the outer box; and a mounting fastener including a head and a shaft, the shaft of the mounting fastener extending through the fastener aperture of the mounting plate, the slot of the sleeve, and the fastener aperture of the outer box, wherein the shaft of the mounting fastener extends into the support member, and wherein the sidewall of the outer box, the sleeve, and the mounting plate are compressed between the head of the mounting fastener and the support member to couple the electrical box assembly to the support member.

* * * * *